United States Patent
Okagaki

(10) Patent No.: US 9,972,586 B2
(45) Date of Patent: May 15, 2018

(54) SEMICONDUCTOR DEVICE AND AUTHENTICATION SYSTEM

(71) Applicant: Renesas Electronics Corporation, Koutou-ku, Tokyo (JP)

(72) Inventor: Takeshi Okagaki, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days. days.

(21) Appl. No.: 15/212,174

(22) Filed: Jul. 15, 2016

(65) Prior Publication Data

US 2017/0092601 A1 Mar. 30, 2017

(30) Foreign Application Priority Data

Sep. 24, 2015 (JP) ................................. 2015-186993

(51) Int. Cl.
*H01L 23/00* (2006.01)
*H01L 27/02* (2006.01)

(52) U.S. Cl.
CPC ........ *H01L 23/576* (2013.01); *H01L 27/0207* (2013.01)

(58) Field of Classification Search
None
See application file for complete search history.

(56) References Cited

U.S. PATENT DOCUMENTS

| 5,499,209 A * | 3/1996 | Oowaki .............. G11C 11/4085 327/390 |
| 2005/0041343 A1* | 2/2005 | Mandal ................ H03K 17/063 361/18 |
| 2005/0174165 A1* | 8/2005 | Shimada ................... G05F 3/20 327/543 |
| 2007/0147147 A1* | 6/2007 | Hirabayashi ......... G11C 7/1051 365/201 |
| 2010/0133583 A1* | 6/2010 | Mawatari ............ H01L 27/0259 257/173 |
| 2013/0047209 A1 | 2/2013 | Satoh et al. |
| 2014/0240038 A1* | 8/2014 | Yoshino ................. H03K 3/011 327/541 |
| 2015/0015335 A1* | 1/2015 | Chen ................. H01L 21/28008 330/277 |

FOREIGN PATENT DOCUMENTS

JP 2011-198317 A 10/2011

* cited by examiner

*Primary Examiner* — Marc Armand
*Assistant Examiner* — Sue Tang
(74) *Attorney, Agent, or Firm* — Shapiro, Gabor and Rosenberger, PLLC

(57) ABSTRACT

In order to realize a silicon PUF of lower power consumption, a semiconductor device includes first and second MIS transistors of the same conductive type in off-state coupled in series, as a PUF element. The PUF element outputs a signal of high level or low level depending on the potential of a connection node of the first and the second MIS transistors. Preferably, the MIS transistors are fin-type FETs.

7 Claims, 15 Drawing Sheets

SEMICONDUCTOR DEVICE AND AUTHENTICATION SYSTEM

CROSS-REFERENCE TO RELATED APPLICATIONS

The disclosure of Japanese Patent Application No. 2015-186993 filed on Sep. 24, 2015 including the specification, drawings and abstract is incorporated herein by reference in its entirety.

BACKGROUND

This invention relates to a semiconductor device and for example, it is preferably used for a semiconductor device with a Physical Unclonable Function (PUF) mounted.

The Physical Unclonable Function (PUF) is an artificial object of outputting intrinsic value (response signal) in reply to a given input (challenge signal), by using an uncontrollable small difference of intrinsic physical properties. By using the PUF property, a cipher and authentication function can be realized at a low cost.

In the PUF (hereinafter, referred to as "silicon PUF") using a semiconductor element, by using variations of the properties in the individual semiconductor elements, intrinsic identification information can be output from the semiconductor circuits of the same design.

As a concrete silicon PUF, Arbiter PUF, Ring Oscillator PUF, and Butterfly PUF are well known. The Arbiter PUF uses variations of signal delays in a signal propagation route using semiconductor circuits. The Ring Oscillator PUF uses variations of oscillation frequencies in ring oscillators. The Butterfly PUF uses variations in the initial state of a latch circuit at the power on (for example, refer to FIGS. 4 to 6 and the related article of Japanese Unexamined Patent Application Publication No. 2011-198317).

SUMMARY

One of the problems in the silicon PUF of the related art is that the power consumption is apt to comparatively get larger. For example, the above Arbiter PUF consumes power for signal propagation. The Ring Oscillator PUF consumes power for oscillation of a ring oscillator. When the power consumption of PUF gets too large, its mounting on a small circuit such as an Integrated Circuits (IC) tag becomes difficult; therefore, a PUF technique with smaller power consumption is desired.

Other problems and novel features will be apparent from the description of the specification and the attached drawings.

A semiconductor device according to one embodiment includes first and second Metal Insulator Semiconductor (MIS) transistors MN1 and MN2 of the same conductive type in off-state coupled in series, as a PUF element CELL. The PUF element CELL outputs a signal of high level or low level depending on the potential of a connection node of the first and the second MIS transistors MN1 and MN2. Preferably, the MIS transistors MN1 and MN2 are fin-type Field Effect Transistors (FET).

According to the above embodiment, it is possible to realize a silicon PUF of lower power consumption.

DETAILED DESCRIPTION

Hereinafter, each embodiment will be described in detail with reference to the drawings. The top plan views and cross-sectional views used in the following description are not in proportion to the actual measurement of each unit, for the sake of easy understanding. In the description of each drawing, the same reference codes are attached to the same or corresponding portions and their description may not be repeated.

First Embodiment

[Structure of Authentication System]

Figure 1:
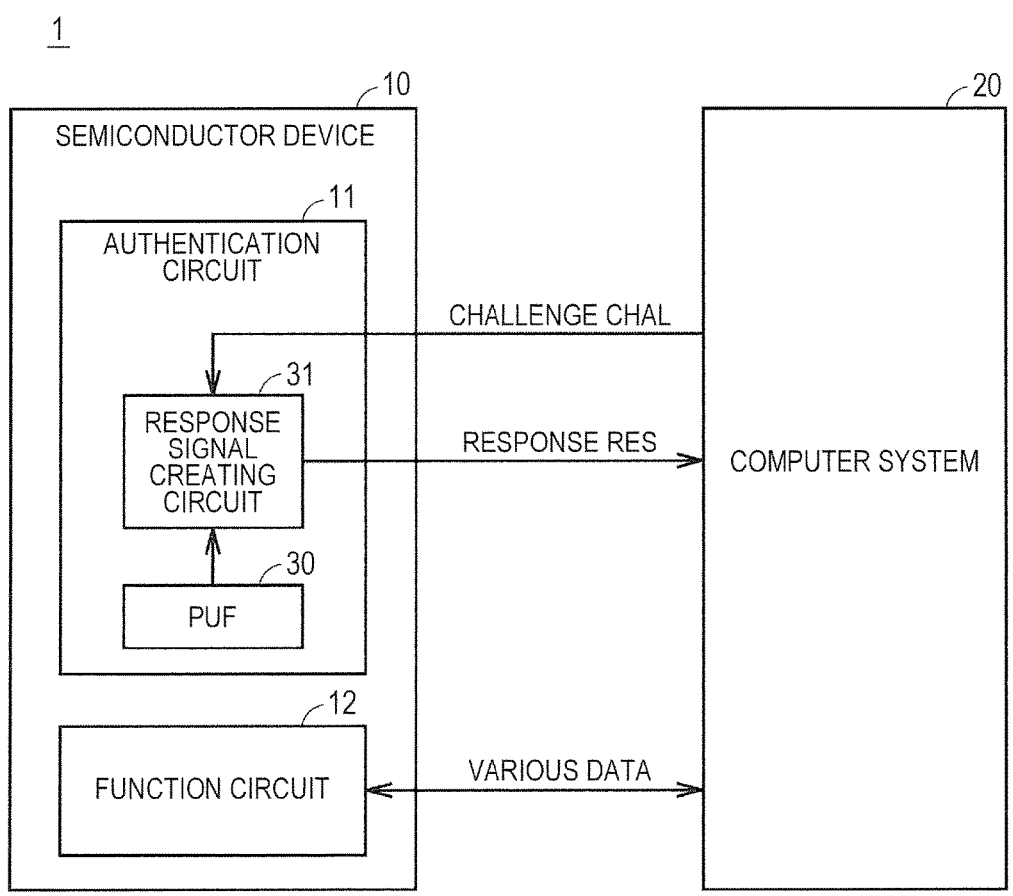
FIG. 1 is a block diagram showing an example of a structure of an authentication system according to a first embodiment.

FIG. 1 is a block diagram showing an example of a structure of an authentication system according to a first embodiment. In an authentication system 1 of FIG. 1, a computer system 20 determines whether or not a semiconductor device 10 is a regular product.

As illustrated in FIG. 1, the semiconductor device 10 includes an authentication circuit 11 for realizing an authentication function with the computer system 20 and a function circuit 12 for achieving a specified function as an integrated circuit. The semiconductor device 10 may be considered to be formed by adding the authentication circuit 11 to the original function circuit 12.

The semiconductor device 10 and the computer system 20 can communicate with each other. The computer system 20 can be considered, for example, as a server for providing an authentication service, provided on a network.

The authentication circuit 11 creates a response signal RES of one or plural bits based on a challenge signal CHAL of plural bits received from the computer system 20 and outputs the created response signal RES to the computer system 20. More specifically, the authentication circuit 11 includes a Physical Unclonable Function (PUF) circuit 30 and a response signal creating circuit 31. The PUF circuit 30 creates an intrinsic signal of N bits for every semiconductor device 10. The concrete structure example of the PUF circuit 30 used for the embodiment will be described in FIGS. 2 to 9.

Figure 3:
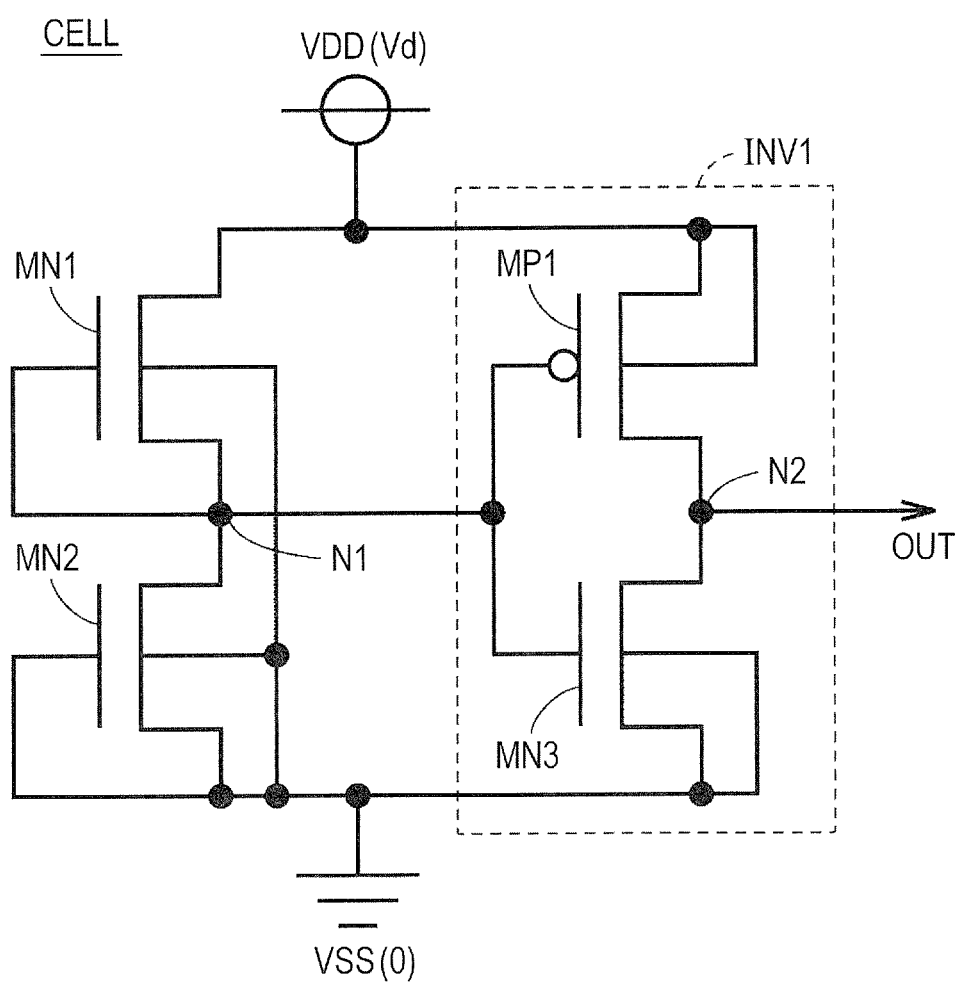
FIG. 3 is a circuit diagram showing one example of the structure of each cell circuit of FIG. 2.

The response signal creating circuit 31 creates the response signal RES of one or plural bits, based on the challenge signal CHAL of plural bits and the output signal (N bits) of the PUF circuit 30. The response signal creating circuit 31 may be, for example, a selector circuit of selecting a part of bit or bits from the signal of N bits output from the PUF circuit 30 according to the challenge signal CHAL. In the embodiment, an example of forming the response signal creating circuit 31 by the selector circuit is illustrated in FIG. 3.

As another example, the response signal creating circuit 31 may be formed by a combined logic circuit of receiving the challenge signal CHAL ad the output signal of the PUF circuit 30. The output signal of the combined logic circuit is output to the computer system 20 as the response signal RES. Alternatively, the response signal creating circuit 31 may be regarded as a cipher function and the output signal of the PUF circuit 30 may be regarded as a cipher key. In this case, the challenge signal CHAL is input from the computer system 20 as a plaintext, while in replay to that, the response signal RES is output from the response signal creating circuit 31 as a ciphertext. As the response signal creating circuit 31, various circuit structures are possible other than the above.

The computer system 20 creates the challenge signal CHAL and outputs it to the authentication circuit 11; in reply to the challenge signal CHAL, the computer system 20 receives the response signal RES output from the authentication circuit 11. The computer system 20 determines whether or not the received response signal RES is the proper one corresponding to the challenge signal CHAL; in the case of the proper response signal RES, it permits the function circuit 12 to operate for the other circuits. For example, various types of data can be exchanged between the computer system 20 and the function circuit 12 of the semiconductor device 10.

Authentication operation in the computer system 20 sometimes requires a large size of database and does not so in other case. Specifically, when the circuit structure of the response signal creating circuit 31 is unclear (or when it cannot be represented as a logical function), the response signals RES corresponding to a lot of challenge signals CHAL are previously measured and the measurement result of this large amount has to be stored in a database with correlation to the individual challenge signals CHAL. In this case, the computer system 20 selects one of the registered challenge signals CHAL and outputs it to the authentication circuit 11, then to perform authentication by checking whether or not the response signal RES received from the authentication circuit 11 agrees with the corresponding response signal RES stored in the database.

When the structure of the response signal creating circuit 31 can be represented as the logical function of using the challenge signal CHAL and the output signal of the PUF circuit 30 as a variable, it does not require a large capacity of a database. In this case, in the computer system 20, the data representing the output signals of the PUF circuit 30 measured previously and the above logical function are stored. At the authentication, the computer system 20 creates a challenge signal CHAL and outputs it to the authentication circuit 11, and receives a response signal RES from the authentication circuit 11. The computer system 20 substitutes the created challenge signal CHAL and the output signal of the regular PUF circuit 30 measured previously into the above logical function, hence to create a regular response signal RES internally. The computer system 20 performs authentication by checking whether or not the received response signal RES agrees with the internally created regular response signal RES.

[Structure Example of PUF Circuit]

Figure 2:
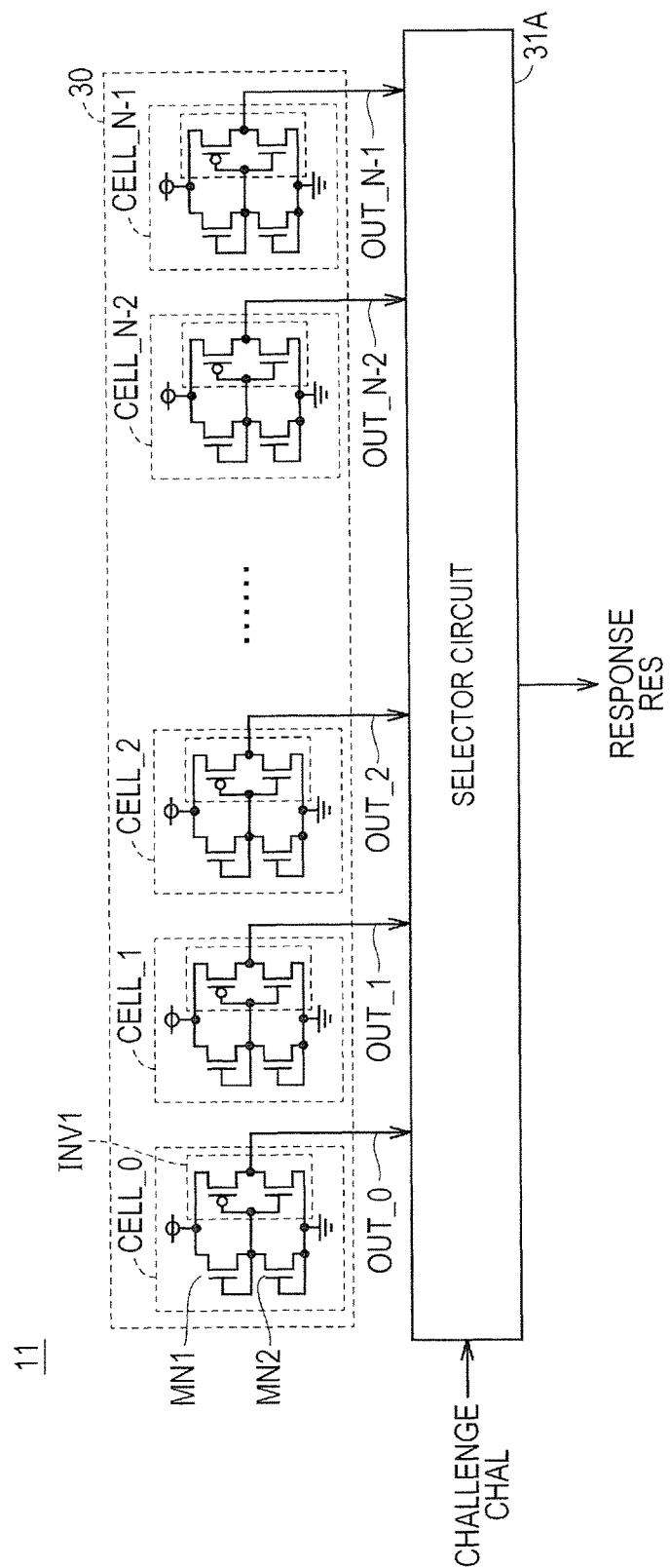
FIG. 2 is a block diagram showing an example of the detailed structure of the authentication circuit of FIG. 1.

FIG. 2 is a block diagram showing an example of the detailed structure of the authentication circuit of FIG. 1. With reference to FIG. 2, the authentication circuit 11 includes the PUF circuit 30 and a selector circuit 31A as the response signal creating circuit 31.

The PUF circuit 30 includes N pieces of cell circuits CELL_0 to CELL_N−1 (also referred to as PUF element). Each cell circuit CELL outputs a signal OUT of high level (H level) or low level (L level). A logic level of the output signal OUT of each cell circuit CELL is determined according to the quality variations in the semiconductor elements forming the respective cell circuits CELL. As specifically described in FIG. 3, each cell circuit CELL includes N-type Metal Insulator Semiconductor (MIS) transistors MN1 and MN2 in off-state, coupled between a power source node and a ground node in series and an inverter INV1 which inverts the logic level of the connection node of the MIS transistors MN1 and MN2 and outputs the same. The output signal OUT of the inverter INV1 is input to the selector circuit 31A.

The selector circuit 31A outputs one or plural bits selected according to the challenge signal CHAL from the output signals OUT_0 to OUT_N−1 of the N pieces of the cell circuit CELL_0 to CELL_N−1. The structure of the selector circuit 31A may be variously considered. For example, by specifying a certain M bit ($1 \leq M < N$), of the N bits, the selector circuit 31A may be formed to output the output signal OUT of the cell circuit CELL corresponding to the specified M bit as the response signal RES, according to the challenge signal CHAL of the N bits. Alternatively, it may be formed to output the exclusive OR of the output signal OUT of the cell circuit CELL corresponding to the specified M bit as the response signal RES.

[Structure of Cell Circuit]

FIG. 3 is a circuit diagram showing one example of the structure of each cell circuit of FIG. 2. With reference to FIG. 3, the cell circuit includes N-type Metal Insulator Semiconductor (MIS) transistors MN1, MN2, and MN3 and P-type MIS transistor MP1. Generally, since an oxide film (Oxide) is used as an insulating film of the MIS transistor, the MIS transistors are often referred to as Metal Oxide Semiconductor (MOS) transistors.

As illustrated in FIG. 3, the N-type MIS transistors MN1 and MN2 are coupled between the power source node VDD and the ground node VSS in series in this order from the top of the figure. The P-type MIS transistor MP1 and the N-type MIS transistor MN3 are coupled between the power source node VDD and the ground node VSS in series in this order and in parallel with the MIS transistor MN1 and MN2 on the whole. The gates of the MIS transistors MP1 and MN3 are mutually coupled together and therefore, the MIS transistors MP1 and MN3 form the inverter INV1. The output signal OUT is output from the connection node N2 of the MIS transistors MP1 and MN3.

Instead of the above inverter INV1, a NAND gate (one input is fixed at H level) or NOR gate (one input is fixed at L level) may be used. More generally, the logic circuit may be whatever structure as far as it outputs a signal of H lever or L level depending on whether the potential of the connection node N1 of the MIS transistors MN1 and MN2 is higher or lower than Vd/2 (Vd is the power potential).

The N-type MIS transistors MN1 and MN2 are in the off-state with the gate and the source (low potential side) coupled together. The connection node N1 of the MIS transistors MN1 and MN2 is coupled to the gate of the P-type MIS transistor MP1 and the N-type MIS transistor MN3. The back gates (also referred to as P well, substrate, or body) of the N-type MIS transistors MN1, MN2, and MN3 are coupled to the ground node VSS and the back gate (referred to as N well or body) of the P-type MIS transistor MP1 is coupled to the power source node VDD.

[Operation of Cell Circuit]

Next, the operation of the above cell circuit CELL will be described. Since the N-type MIS transistors MN1 and MN2 are both in off-state, the potential of the connection node N1 is determined by a resistance ratio of the MIS transistors MN1 and MN2. The resistance ratio of the MIS transistors MN1 and MN2 is determined by the ratio of off-leak current. Therefore, when the off-leak current is equal between the MIS transistors MN1 and MN2, the potential of the power source node VDD is defined as Vd, and the potential of the ground node VSS is defined as 0, the potential of the connection node N1 becomes Vd/2.

Actually, however, there exist variations caused by the manufacturing process in every MIS transistor; hence, a possibility that the off-leak current of the MIS transistor MN1 is completely equal to that of the MIS transistor MN2 is really low. For example, when the off-leak current of the MIS transistor MN1 is larger than that of the MIS transistor MN2, the potential of the connection node N1 is larger than Vd/2. Therefore, the potential of the signal OUT output from the node N2 gets substantially equal to 0 (L level). On the contrary, when the off-leak current of the MIS transistor MN1 is smaller than that of the MIS transistor MN2, the potential of the connection node N1 is smaller than Vd/2. Therefore, the potential of the signal OUT output from the node N2 gets substantially equal to Vd (H level).

This output signal OUT of each cell circuit CELL is determined to be H level or L level at random because of the property variations in the MIS transistors caused by the manufacturing process. Accordingly, each cell circuit CELL can be used as a PUF element.

The above circuit operation is true when the substrate bias effect of the N-type MIS transistor MN1 hardly occurs. In the case of the circuit structure of FIG. 3, the source potential of the MIS transistor MN1 (the potential of the node N1) is lower than the potential of the back gate (the potential of the ground node VSS). Therefore, when each transistor forming the cell circuit CELL is manufactured in the planar structure of the related art, the back gate potential affects spreading of a depletion layer at off-time. Specifically, in order to spread the depletion layer of the MIS transistor MN1 more, the threshold voltage of the MIS transistor MN1 increases and accordingly, the off-leak current of the MIS transistor MN1 decreases. As the result, since the potential of the node N1 becomes smaller than Vd/2, the outputs of many cell circuits CELL are fixed at H level. In short, the average value of the output voltages of the cell circuits CELL_0 to CELL_N−1 gets close to the power voltage Vd.

On the contrary, in the case of the MIS transistor called FinFET (fin-type Field Effect Transistor (FET)), the depletion layer at the off-time spreads to the whole fin near the gate electrode from the viewpoint of the structure and therefore, the thickness of the depletion layer hardly changes by the effect of the back gate potential. As the result, it is hardly subject to the substrate bias effect, and the average value of the output voltages of the cell circuits CELL_0 to CELL_N−1 becomes substantially equal to Vd/2 (the output of the H level and the output of the L level occur at random). Therefore, as the MIS transistor used for the above cell circuit CELL, FinFET is preferably used.

Specifically, in the case of the planar type MOS transistor of the related art (in the case of the process with the gate length 28 nm), when the power voltage is 1 V and the substrate bias is 0.4 V, a fluctuation in the threshold voltage is about 50 mV. On the contrary, in the case of the FinFET of the same transistor size, when the power voltage is 1 V and the substrate bias is 0.4 V, a fluctuation in the threshold voltage is fairly small, 10 mV and less, which can be neglected, differently from the variations in the threshold voltage caused by the manufacturing process.

In FIG. 3, when the back gate of the N-type MIS transistor MN1 is coupled to the source thereof, the substrate bias effect does not occur and therefore, the MOS transistor in the planar structure of the related art can be used. In this case, however, the MIS transistor MN1 has to be formed within a triple well, which makes the element structure complicated disadvantageously.

[Structure of FinFET]

Hereinafter, a structure and a manufacturing method of the FinFET will be described in brief.

Figure 4:
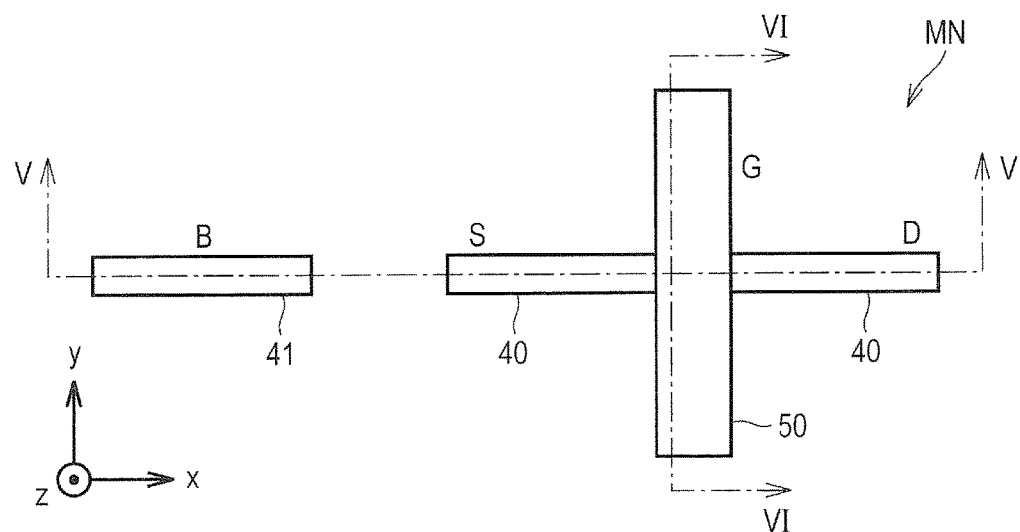
FIG. 4 is a top plan view showing the layout of N-type MIS transistor formed as a Fin FET on a semiconductor substrate.
Figure 5:
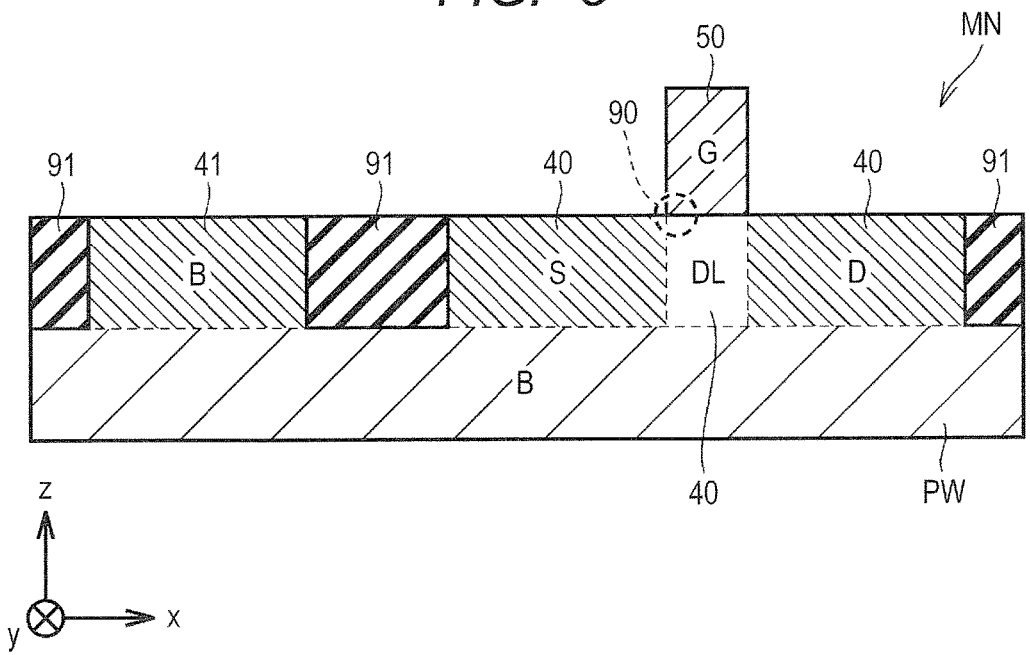
FIG. 5 is a cross-sectional view taken along a cutting line V-V in FIG. 4.
Figure 6:
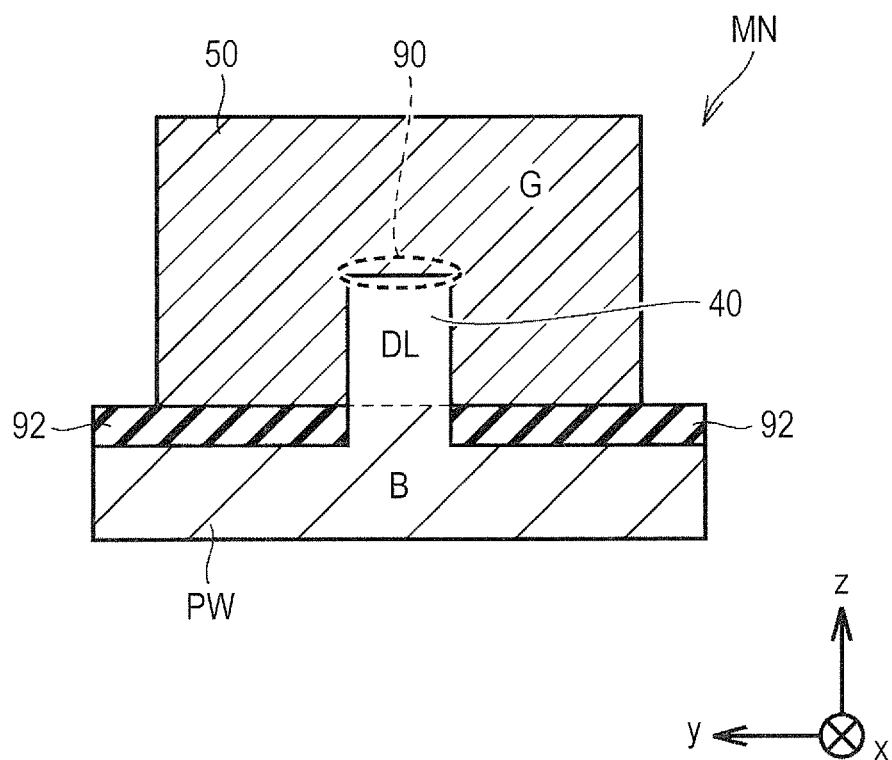
FIG. 6 is a cross-sectional view taken along a cutting line VI-VI in FIG. 4.

FIG. 4 is a top plan view showing the layout of the N-type MIS transistor formed as the FinFET on a semiconductor substrate. FIG. 5 is a cross-sectional view taken along a cutting line V-V of FIG. 4. FIG. 6 is a cross-sectional view taken along a cutting line VI-VI of FIG. 4.

With reference to FIGS. 4 to 6, the N-type MIS transistor formed as the FinFET includes a fin wiring 40 formed on a P-type well PW. The fin wiring 40 extends along the x-direction on the substrate and protrudes in the z-direction (substrate vertical direction). The fin wiring 40 is formed by selectively etching the surface of the P-type well PW of the semiconductor substrate SUB. As illustrated in FIG. 6, a silicon oxide film formed according to a Chemical Vapor Deposition (CVD) method is provided in a space between the adjacent fin wirings (in a portion without the fin wiring 40) as an isolation film 92.

A gate wiring 50 as a gate electrode G is formed to cover the top surface and the lateral surface of the fin wiring 40 with the gate insulating film (not illustrated) intervening therebetween. The gate wiring 50 extends in the y-direction that is a direction of intersecting the fin wiring 40. For example, semiconductor such as polycrystalline silicon, conductive compound such as titanium nitride, simple metal material such as tungsten, or a stacked film of one of them is used for the gate wiring 50.

After forming the gate wiring 50, dopant is injected into the fin wiring 40 with the gate wiring 50 used as a mask, hence to form a source region S and drain region D in a portion other than the channel region surrounded by the gate wiring 50. Here, when manufacturing an N-type MIS transistor, the fin wiring 40 is formed on a P-type substrate or a P-type well and at the same time, N-type dopant is injected into the fin wiring 40. On the other hand, when manufacturing a P-type MIS transistor, the fin wiring 40 is formed on an N-type well and at the same time, P-type dopant is injected into the fin wiring 40.

Of the fin wiring 40, a portion where the dopant is not injected in the dopant injection process, or a portion near the gate electrode G is used as a channel region in the on-state and the above becomes a depletion layer DL in the off-state. As illustrated in FIGS. 5 and 6, the depletion layer DL expands to the whole fin in the vicinity of the gate electrode G. In FIGS. 5 and 6, an area 90 indicated by a dotted circle is the position for determining a threshold voltage. It is in the boundary between the source region and the channel region and a charge amount flowing from the source region to the channel region decides the threshold voltage. In the FinFET, since the state of the area 90 hardly fluctuates by the substrate bias, the threshold voltage has smaller dependence on the substrate bias.

A first and a second local wirings (LIC: Local Inter-Connect) not illustrated are formed using a simple metal material, for example, tungsten, to be in ohmic contact with the upper surface and the lateral surface of the source region S and drain region D. These first and second local wirings (not illustrated) work as a source electrode and a drain electrode respectively. The gate wiring 50 and the above local wirings are further coupled to another local wiring (not illustrated), or the upper metal wiring layer (not illustrated) through a via hole formed in the interlayer insulating layer not illustrated.

As illustrated in FIG. 5, another fin wiring 41 formed on the P-type well PW is used in order to apply a voltage to the P-type well PW corresponding to the back gate B. A silicon oxide film is formed between the fin wirings 40 and 41 as an isolation film 91.

[Layout Example of Cell Circuit]

Hereinafter, the layout of the cell circuit CELL of FIG. 3 on a semiconductor substrate will be described.

Figure 7:
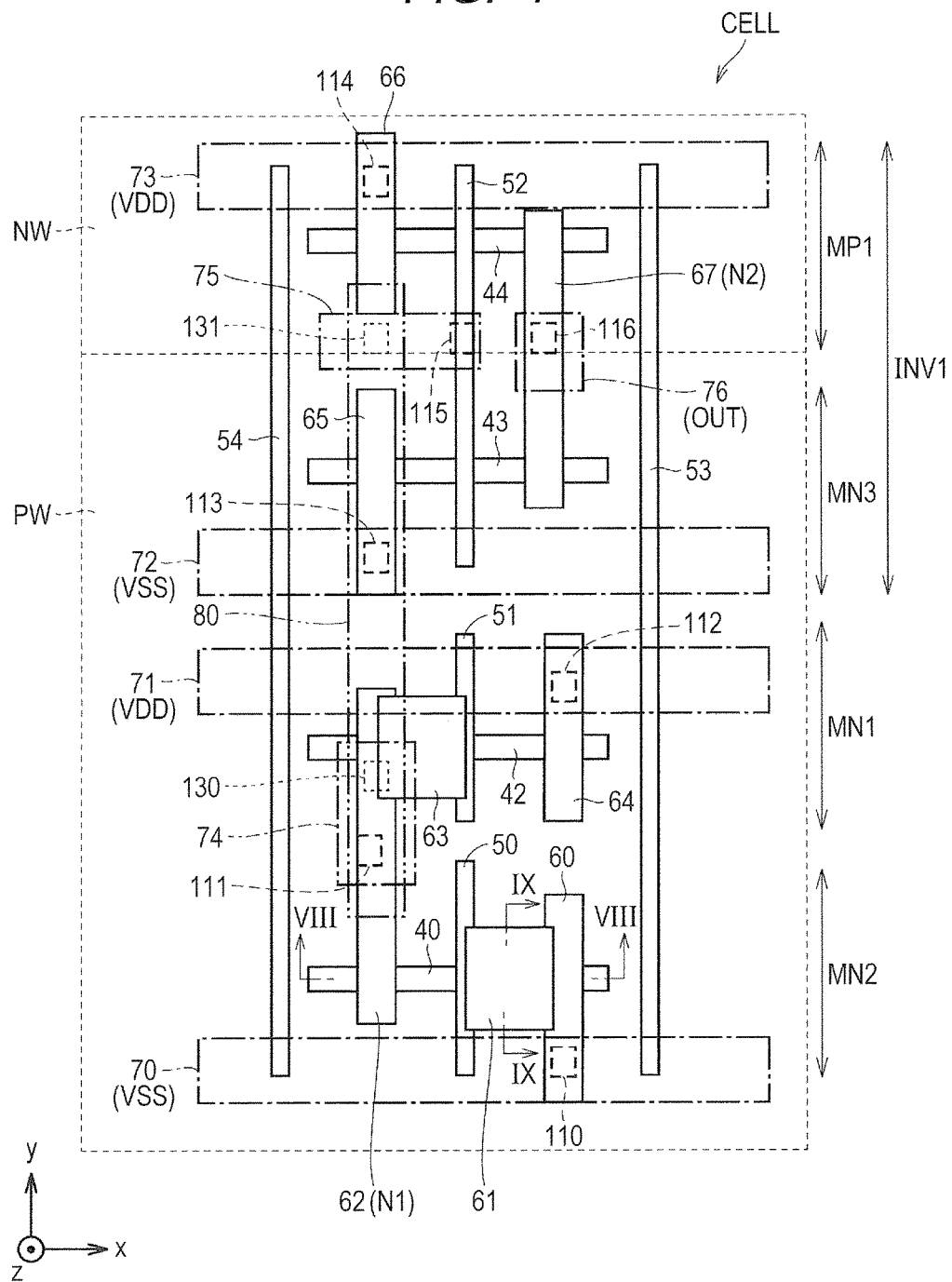
FIG. 7 is a top plan view showing the layout of the cell circuit of FIG. 3 on a semiconductor substrate.
Figure 8:
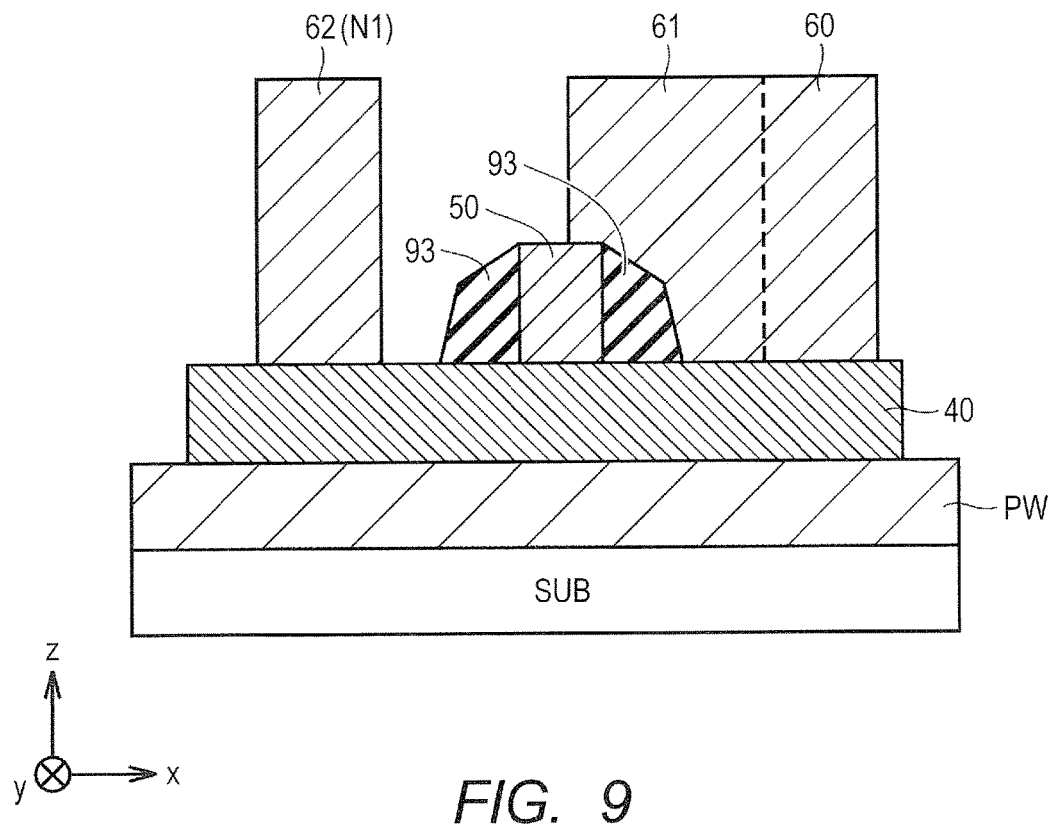
FIG. 8 is a cross-sectional view taken along a cutting line VIII-VIII in FIG. 7.
Figure 9:
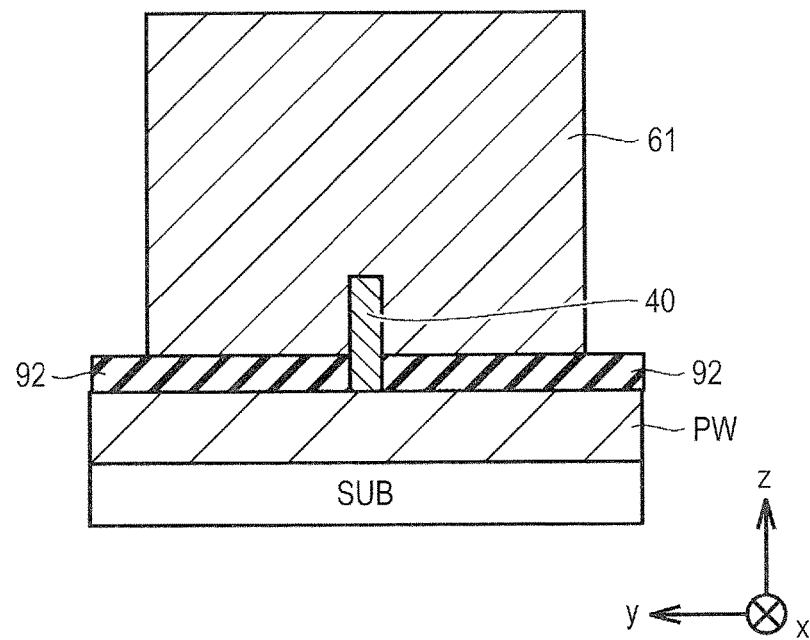
FIG. 9 is a cross-sectional view taken along a cutting line IX-IX in FIG. 7.

FIG. 7 is a top plan view showing the layout of the cell circuit of FIG. 3 on a semiconductor substrate. FIG. 8 is a cross-sectional view taken along a cutting line VIII-VIII of FIG. 7. FIG. 9 is a cross-sectional view taken along a cutting line IX-IX of FIG. 7. In FIGS. 7 to 9, a direction inside the substrate is defined as the x direction and the y direction, and the direction vertical to the substrate is defined as the z direction. In FIG. 7, a first metal wiring layer formed by interposing the MIS transistors formed on the substrate surface and the interlayer insulating layer (not illustrated) is indicated by a dashed line, and a second metal wiring layer formed by interposing the first metal wiring layer and the interlayer insulating layer (not illustrated) is indicated by a chain double-dashed line.

With reference to FIGS. 7 to 9, the cell circuit CELL includes a plurality of fin wirings 40, 42, 43, and 44 extending in the x direction and a plurality of gate wirings 50, 51, 52, 53, and 54 extending in the y direction crossing the x direction. As illustrated in FIG. 8, an insulating film 93 for element isolation is formed on the lateral surfaces of the respective gate wirings 50 to 54. As illustrated in FIG. 9, an insulating film 92 for element isolation is formed in a space between the adjacent fin wirings (a portion where the fin wirings 40, 42 to 44 are not formed).

The fin wirings 40, 42, 43, and 44 are formed in the y direction in this order. The fin wirings 40, 42, and 43 are formed on the P-type well PW and the fin wiring 44 is formed on the N-type well NW. The gate wiring 50 crosses the fin wiring 40 in plane view and coupled to the top surface and the lateral surface of the fin wiring 40 through a gate insulating film (not illustrated). The gate wiring 51 crosses the fin wiring 42 in plane view and coupled to the top surface and the lateral surface of the fin wiring 40 through the gate insulating film (not illustrated). The gate wiring 52 crosses the both fin wirings 43 and 44 and coupled to the respective top surfaces and lateral surfaces of the respective fin wirings 43 and 44 through the gate insulating film (not illustrated). The gate wirings 53 and 54 are dummy wirings formed in order to secure the pattern precision of lithography.

The N-type MIS transistor MN1 of FIG. 2 is formed by the fin wiring 42 and the gate wiring 51. The N-type MIS transistor MN2 is formed by the fin wiring 40 and the gate wiring 50. The N-type MIS transistor MN3 is formed by the fin wiring 43 and the gate wiring 52. The P-type MIS transistor MP1 is formed by the fin wiring 44 and the gate wiring 52. The gate wiring 52 is shared between the MIS transistors MN3 and MP1.

The cell circuit CELL further includes a plurality of local wirings 60, 62, 64, 65, 66, and 67 extending in the y direction and a plurality of local wirings 61 and 63 for each coupling the gate and the source of the MIS transistor.

The local wiring 60 is used as the source electrode of the MIS transistor MN2 by being coupled directly to the source region of the fin wiring 40. Here, directly coupling means that it is coupled not through the contact hole formed in the interlayer insulating layer (it is true to in the following description). The local wiring 60 is coupled to the metal wiring 70 (corresponding to the ground wiring and ground node VSS) extending in the x direction, provided in the first metal wiring layer through a contact hole 110. The local wiring 60 is further coupled directly to the gate wiring 50 through the local wiring 61.

The local wiring 62 is used as the drain electrode of the MIS transistor MN2 by being coupled directly to the drain region of the fin wiring 40 and at the same time, used as the source electrode of the MIS transistor MN1 by being coupled directly to the source region of the fin wiring 42. The local wiring 62 corresponds to the connection node N1 of FIG. 2. The local wiring 62 is further coupled directly to the gate wiring 51 through the local wiring 63.

The local wiring 64 is used as the drain electrode of the MIS transistor MN1 by being coupled directly to the drain region of the fin wiring 42. The local wiring 64 is coupled to the metal wiring 71 (corresponding to the power wiring and power source node VDD), extending in the x direction, provided in the first metal wiring layer through a contact hole 112.

The local wiring 65 is used as the source electrode of the MIS transistor MN3 by being coupled directly to the source region of the fin wiring 43. The local wiring 65 is coupled to the metal wiring 72 (corresponding to the ground wiring and ground node VSS) extending in the x direction, provided in the first metal wiring layer through a contact hole 113.

The local wiring 66 is used as the source electrode of the P-type MIS transistor MP1 by being coupled directly to the source region of the fin wiring 44. The local wiring 66 is coupled to the metal wiring 73 (corresponding to the power source wiring and power source node VDD) extending in the x direction, provided in the first metal wiring layer through a contact hole 114.

The local wiring 67 is used as the drain electrode of the MIS transistor MN3 by being coupled directly to the drain region of the fin wiring 43 and at the same time, it is used as the drain electrode of the MIS transistor MP1 by being coupled directly to the drain region of the fin wiring 44. The local wiring 67 corresponds to the connection node N2 of FIG. 2. The local wiring 67 is further coupled to the metal wiring 76 provided on the first metal wiring layer through a contact hole 116, hence to output the output signal OUT to the metal wiring 76.

A metal wiring 80, extending in the y direction, provided in the second metal wiring layer is provided in order to couple the local wiring 62 (connection node N1) and the gate wiring 52 in a direct current way. Specifically, the local wiring 62 is coupled to the metal wiring 74 provided in the first metal wiring layer through a contact hole 111. The gate wiring 52 is coupled to the metal wiring 75 provided in the first metal wiring layer through a contact hole 115. The metal wiring 80 is coupled to the metal wiring 74 through a contact hole 130 and at the same time, coupled to the metal wiring 75 through a contact hole 131.

[Modified Example 1 of Layout of Cell Circuit]

Figure 10:
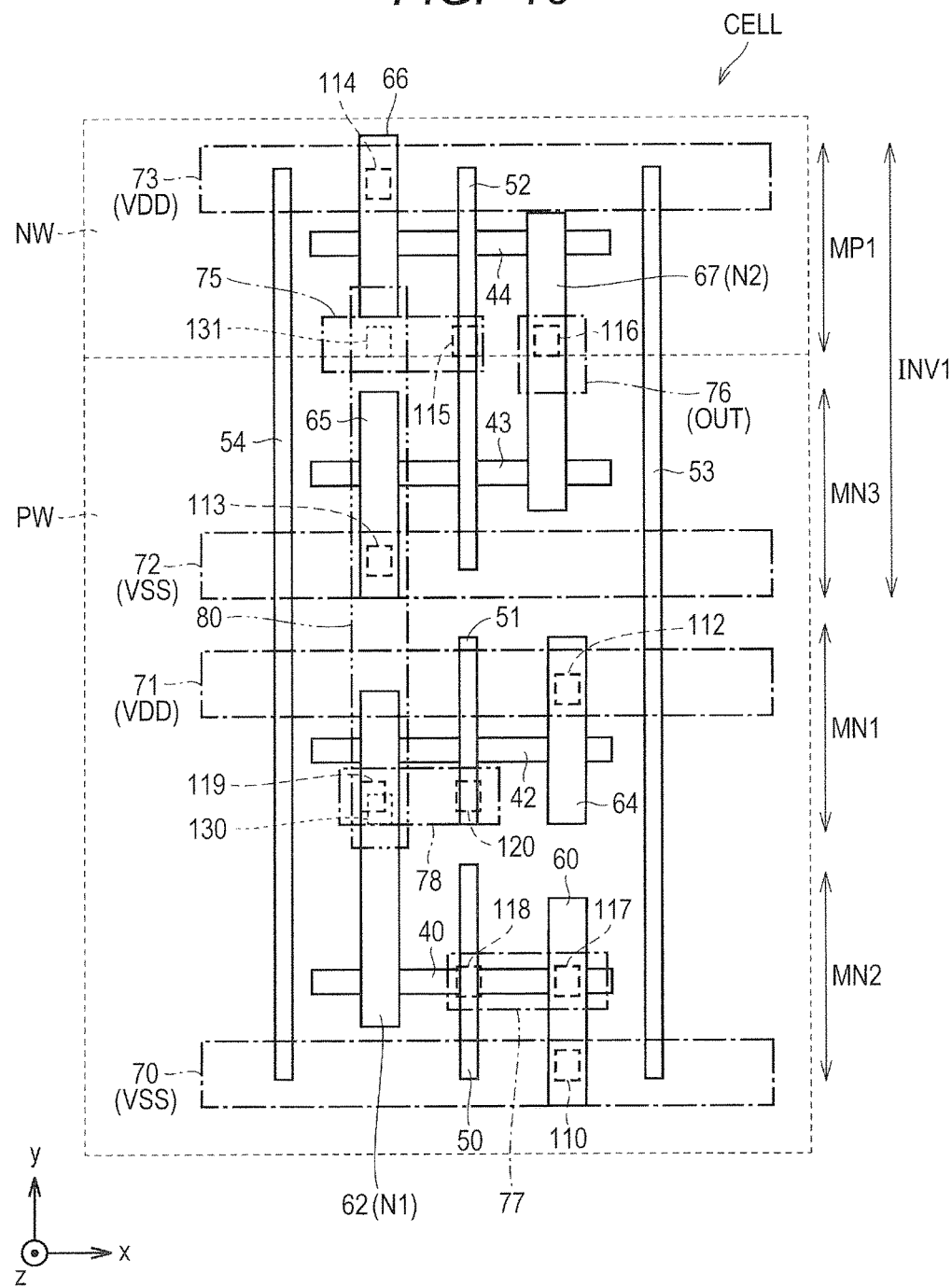
FIG. 10 is a top plan view showing a first modified example of the layout of FIG. 7.

FIG. 10 is a top plan view showing a first modified example of the layout of FIG. 7. The layout of FIG. 10 is different from the layout of FIG. 7 in that metal wirings 77 and 78 are provided in the first metal wiring layer, instead of the local wirings 61 and 63.

Specifically, referring to FIG. 10, the metal wiring 77 is coupled to the local wiring 60 as the source electrode through a contact hole 117 and at the same time, coupled to the gate wiring 50 through a contact hole 118. The metal wiring 78 is coupled to the local wiring 62 (node N1) as the source electrode through a contact hole 119 and at the same time, coupled to the gate wiring 51 through a contact hole 120. Further, the metal wiring 80 formed in the second metal wiring layer is coupled to the metal wiring 78 through the contact hole 130. Therefore, the metal wiring 74 of FIG. 7 is not provided in the layout of FIG. 10.

The other points of FIG. 10 are the same as those of FIG. 7 and therefore, the same reference codes are attached to the same or corresponding portions without repeating the description thereof. The layout of FIG. 10 is useful for the case of supporting only one layer of local wiring because of the restriction of the layout.

[Modified Example 2 of Layout of Cell Circuit]

Figure 11:
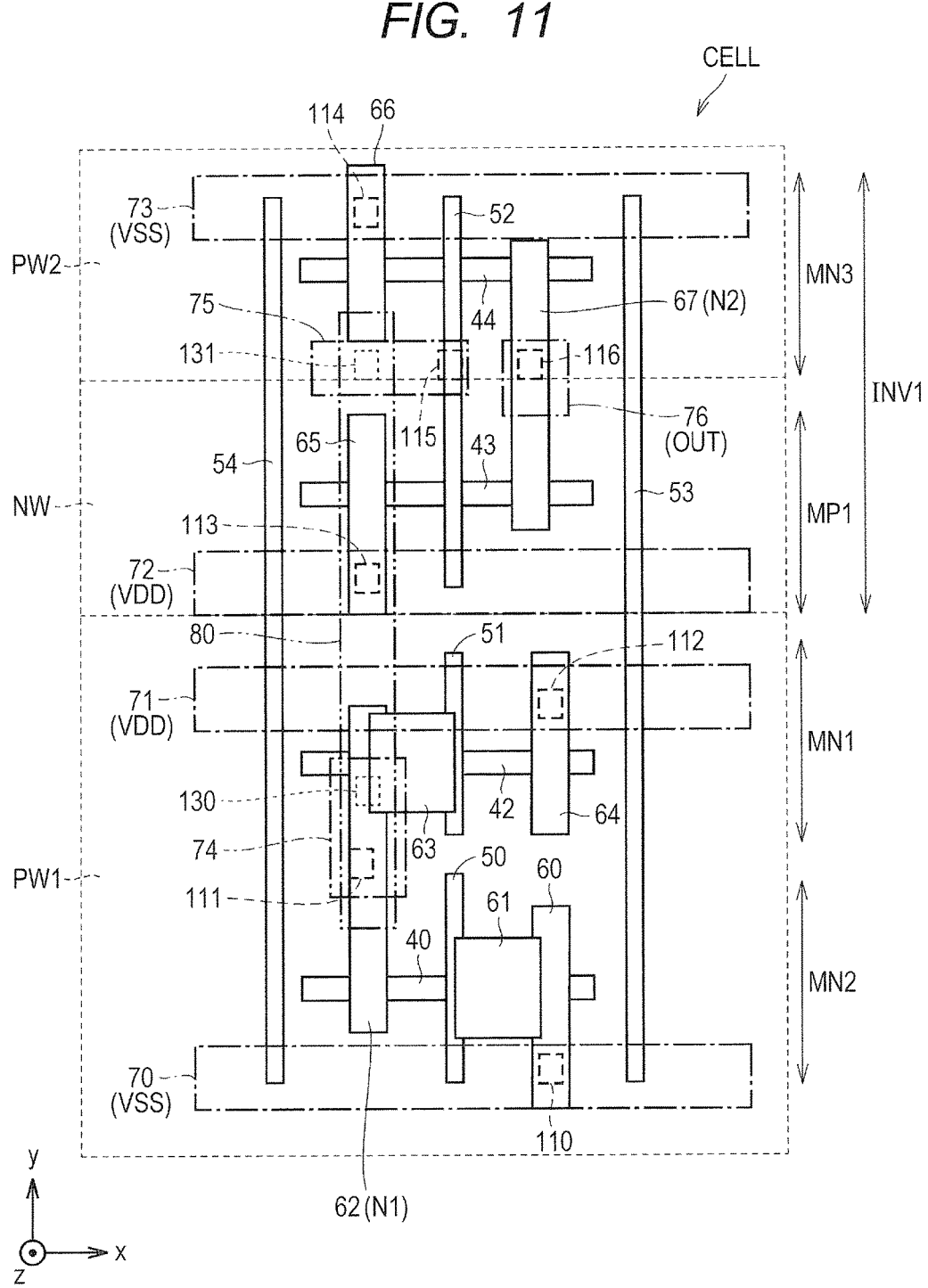
FIG. 11 is a top plan view showing a second modified example of the layout of FIG. 7.

FIG. 11 is a top plan view showing a second modified example of the layout of FIG. 7. The layout of FIG. 11 is different from that of FIG. 7 in the position of the N-type well NW.

Specifically, referring to FIG. 11, the N-type well NW is interposed between the first P-type well PW1 and the second P-type well PW2. The fin wirings 40 and 42 are formed on the first P-type well PW1, the fin wiring 43 is formed on the N-type well NW, and the fin wiring 44 is formed on the second P-type well PW2. It is the same as the case of FIG. 7 in that the ground potential (VSS) is given to the metal wiring 70 and that the power potential (VDD) is given to the metal wiring 71. On the other hand, the power potential (VDD) is given to the metal wiring 72 and the ground potential (VSS) is given to the metal wiring 73, contrary to the case of FIG. 7.

According to the above change, in the case of FIG. 11, the P-type MIS transistor MP1 of FIG. 3 is formed by the fin wiring 43 and the gate wiring 52. The N-type MIS transistor MN3 is formed by the fin wiring 44 and the gate wiring 52. The local wiring 65 forms the source electrode of the P-type MIS transistor MP1 and the local wiring 66 forms the source electrode of the N-type MIS transistor MN3.

Since the other points of FIG. 11 are the same as in the case of FIG. 7, the same reference codes are attached to the same or corresponding portions without repeating the description thereof.

[Effect of First Embodiment]

Figure 12A:
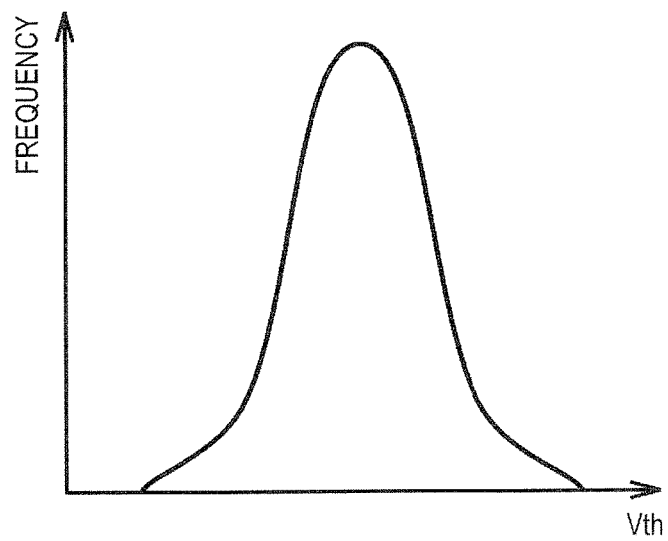
FIGS. 12A and 12B are views for use in describing variations of properties in the MIS transistors caused by the manufacturing process.
Figure 12B:
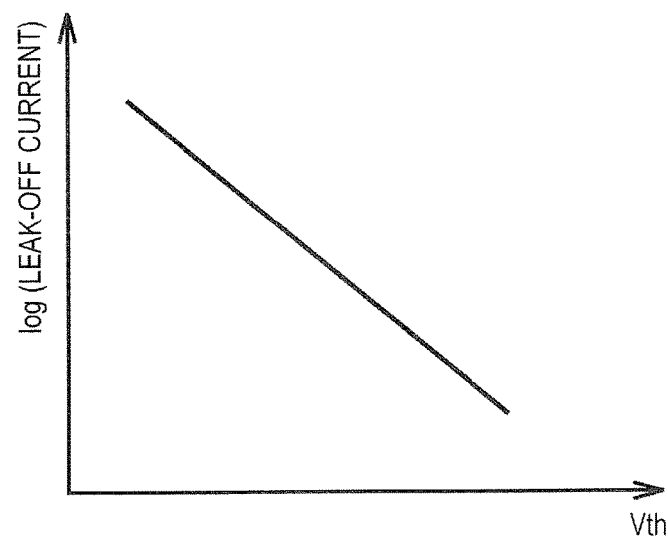

Hereinafter, the effect of the PUF circuit constituted in the above will be described. FIGS. 12A and 12B are views for use in describing property variations in the MIS transistor caused by the manufacturing process.

FIG. 12A is a graph schematically illustrating a variation degree of a threshold voltage Vth; the horizontal axis of FIG. 12A indicates the threshold voltage Vth and the vertical axis indicates the frequency. As illustrated in FIG. 12A, the threshold voltage Vth of the MIS transistor is scattered in a normal distribution shape, caused by the manufacturing process. FIG. 12B is a graph indicating a relation between a leak current and the threshold voltage Vth. The horizontal axis of FIG. 12B indicates the threshold voltage Vth and the vertical axis indicates the volume of the leak current in a log scale. As illustrated in FIG. 12B, the leak current increases and decreases exponentially according to the fluctuation of the threshold voltage Vth.

As mentioned above, the potential of the connection node N1 in FIG. 2 changes exponentially according to the change of the threshold voltage Vth. This is effective in making the output signal from the cell circuit CELL stable. When the potential of the node N1 is close to Vd/2, the logic level of the output signal OUT may fluctuate depending on the use environment and the operation may be unstable. As mentioned above, the size of the off-leak current fluctuates exponentially according to the change of the threshold voltage Vth, hence to reduce a possibility of the potential of the node N1 getting close to Vd/2. As the result, according to the embodiment, the output of the PUF circuit can be stabilized.

Further, since the current flowing in each cell circuit (PUF element) is only the off-leak current, power consumption can be reduced. After the power on, the output signals of the respective cell circuits (PUF elements) are immediately fixed at H level or L level and become readable, which enables a high speed operation of the PUF circuits. In order to increase the number of the output bits of the PUF circuits, the number of the cell circuits (PUF elements) has to be increased.

Second Embodiment

In a semiconductor device of a second embodiment, an example of changing the conductive type of the MIS transistor forming each cell circuit (PUF element) will be described.

[Structure of Cell Circuit]

Figure 13:
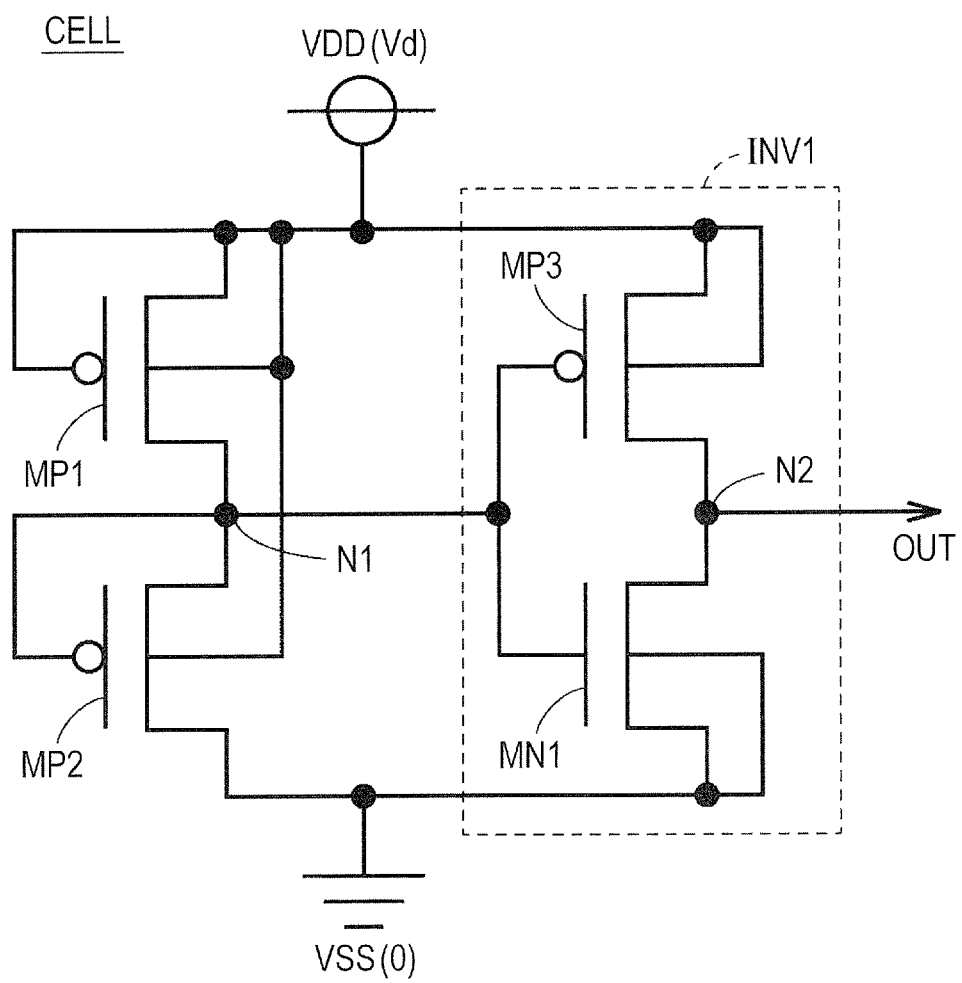
FIG. 13 is a circuit diagram of a cell circuit forming a PUF circuit in a semiconductor device according to a second embodiment.

FIG. 13 is a circuit diagram of a cell circuit forming the PUF circuit in the semiconductor device according to the second embodiment. With reference to FIG. 13, the cell circuit includes P-type MIS transistors MP1, MP2, and MP3 and an N-type MIS transistor MN1.

The P-type MIS transistors MP1 and MP2 are coupled between the power source node VDD and the ground node VSS in series in this order. The P-type MIS transistor MP3 and the N-type MIS transistor MN1 are coupled between the power source node VDD and the ground node VSS in series in this order and in parallel with the MIS transistors MP1 and MP2 on the whole. The gates of the MIS transistors MP3 and MN1 are mutually coupled and therefore, the MIS transistors MP3 and MN1 form the inverter INV1. The output signal OUT is output from the connection node N2 of the MIS transistors MP3 and MN1.

Instead of the above inverter INV1, a NAND gate (one input is fixed at H level) or NOR gate (one input is fixed at L level) may be used. More generally, the logic circuit may be whatever structure as far as it outputs a signal of H lever or L level depending on whether the potential of the connection node N1 of the MIS transistors MP1 and MP2 is higher or lower than Vd/2 (Vd is the power potential).

Each of the P-type MIS transistors MP1 and MP2 is in the off-state with the gate and the source (high potential side) coupled together. The connection node N1 of the MIS transistors MP1 and MP2 is coupled to the gate of the P-type MIS transistor MP3 and N-type MIS transistor MN1. The back gates (also referred to as N well, substrate, or body) of the P-type MIS transistors MP1, MP2, and MP3 are coupled to the power source node VDD and the back gate (referred to as P well or body) of the N-type MIS transistor MN1 is coupled to the ground node VSS.

[Operation of Cell Circuit]

The operation of the cell circuit of FIG. 13 is the same as in the case of FIG. 3; therefore, it will be briefly summarized in the below. In FIG. 13, since the P-type MIS transistors MP1 and MP2 are both in the off-state, the potential of the connection node N1 is determined by a ratio of the off-leak currents of the MIS transistors MP1 and MP2. Since the off-leak current ratio of the MIS transistors MP1 and MP2 fluctuates at random, caused by the manufacturing process, the cell circuits can be used as the PUF element.

Also in the case of the circuit of FIG. 13, since the source potential (the potential of the connection node N1) of the P-type MIS transistor MP2 is lower than the potential of the back gate (the potential of the power source node VDD), the substrate bias effect of the P-type MIS transistor MP2 can be a problem. However, the MIS transistors MP1, MP2, MP3, and MN1 are formed by the FinFET, hence to be free from the substrate bias effect.

On the other hand, when the respective MIS transistors are formed by the planar type MOS transistors of the related art, the back gate of the MIS transistor MP2 is coupled to the source (the connection node N1), hence to be free from the substrate bias effect. In this case, however, the MIS transistor MP2 has to be formed within a triple well.

[Example of Layout of Cell Circuit]

Hereinafter, the layout of the cell circuit CELL of FIG. 13 on a semiconductor substrate will be described.

Figure 14:
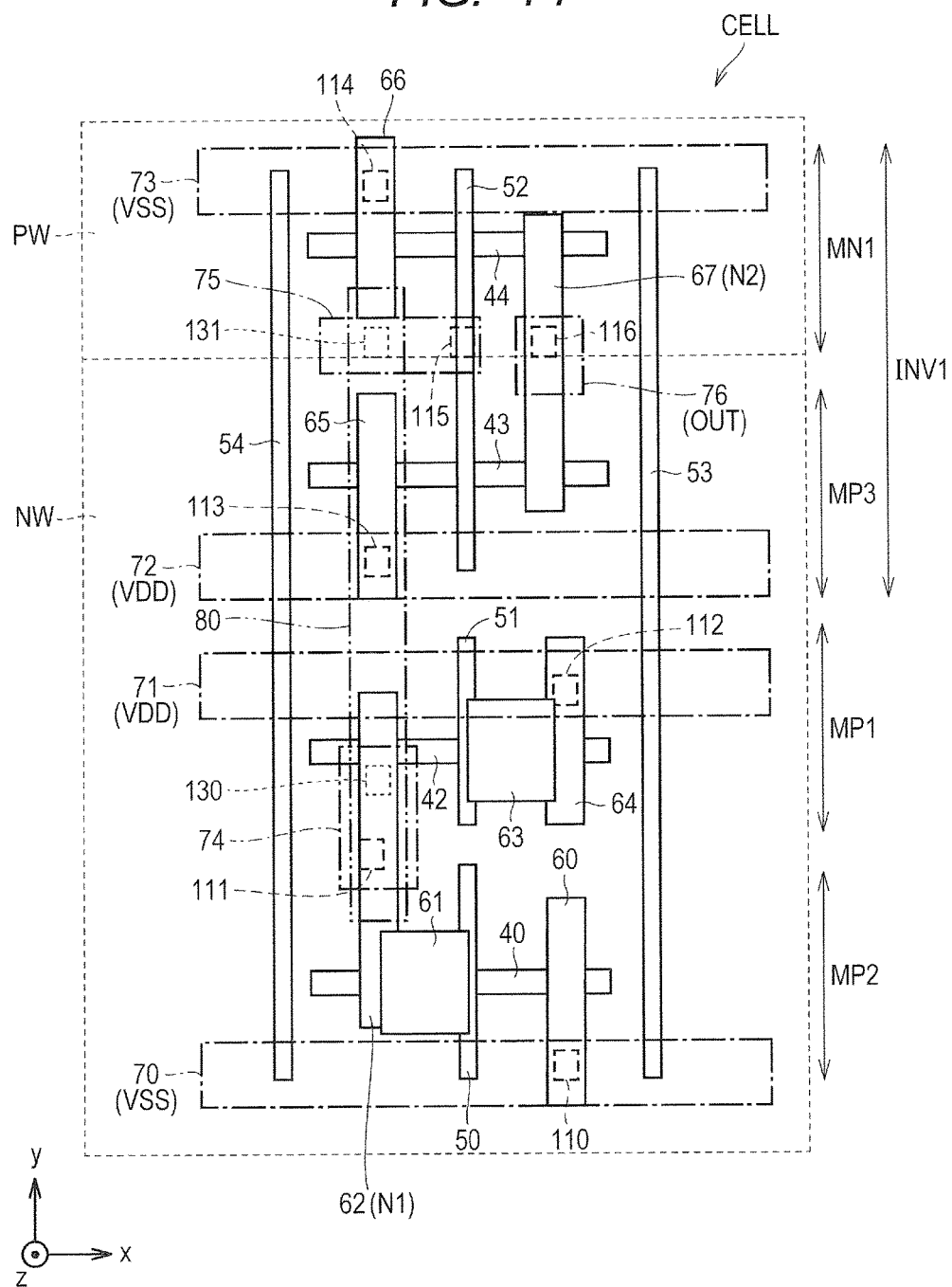
FIG. 14 is a top plan view showing the layout of the cell circuit of FIG. 13 on a semiconductor substrate.

FIG. 14 is a top plan view showing the layout of the cell circuit of FIG. 13 on a semiconductor substrate. Since the layout of the cell circuit CELL of FIG. 13 illustrated in FIG. 1 is similar to the layout of the cell circuit of FIG. 3 described in FIG. 7, only the different point from FIG. 7 will be mainly described in the below.

In the case of FIG. 14, the fin wirings 40, 42, and 43 are formed on the N-type well NW and the fin wiring 44 is formed on the P-type well PW. The P-type MIS transistor MP1 of FIG. 13 is formed by the fin wiring 42 and the gate wiring 51. The P-type MIS transistor MP2 is formed by the fin wiring 40 and the gate wiring 50. The P-type MIS transistor MP3 is formed by the fin wiring 43 and the gate wiring 52. The N-type MIS transistor MN1 is formed by the fin wiring 44 and the gate wiring 52. The gate wiring 52 is shared between the MIS transistors MP3 and MN1.

In the case of FIG. 14, the ground potential (VSS) is given to the metal wiring 70 and the power potential (VDD) is given to the metal wiring 71, similarly to the case of FIG. 7. On the other hand, the power potential (VDD) is given to the metal wiring 72 and the ground potential (VSS) is given to the metal wiring 73, contrary to the case of FIG. 7.

Since the source is on the side of high potential and the drain is on the side of low potential in the P-type MIS transistor, the local wiring 60 forms the drain electrode of the MIS transistor MP2 in FIG. 14. Similarly, the local wiring 62 forms the source electrode of the MIS transistor MP2 and at the same time, forms the drain electrode of the MIS transistor MP1. The local wiring 64 forms the source electrode of the MIS transistor MP2. The local wiring 65 forms the source electrode of the P-type MIS transistor MP3. The local wiring 66 forms the source electrode of the N-type MIS transistor MN1. The local wiring 67 forms the drain electrode of the P-type MIS transistor MP3 and at the same time, forms the drain electrode of the N-type MIS transistor MN1.

Further, the arrangement of the local wirings 61 and 63 in FIG. 14 is different from the case of FIG. 7 (opposite to FIG. 7 with the gate wiring intervening therebetween). Specifically, the local wiring 61 couples the gate wiring 50 and the local wiring 62 so as to couple the gate and the source (high potential side) of the P-type MIS transistor MP2. The local wiring 63 couples the gate wiring 51 and the local wiring 64 so as to couple the gate and the source (high potential side) of the P-type MIS transistor MP1.

The other points of FIG. 14 are the same as in the case of FIG. 7; therefore, the same reference codes are attached to the same or corresponding portions without repeating the description thereof.

[Modified Example of Layout of Cell Circuit]

Figure 15:
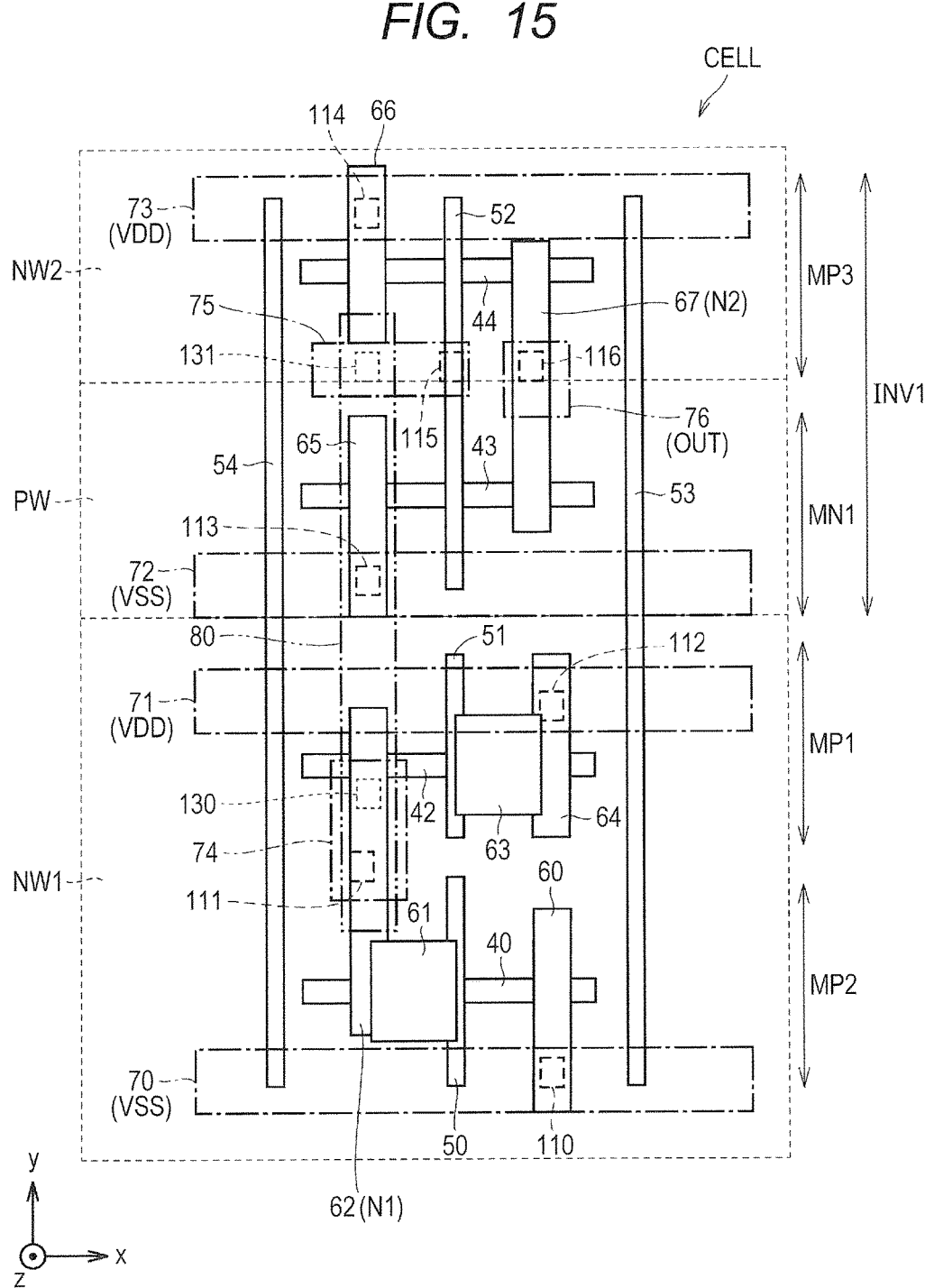
FIG. 15 is a top plan view showing a modified example of the layout of FIG. 14.

FIG. 15 is a top plan view showing a modified example of the layout of FIG. 14. The layout of FIG. 15 is different from that of FIG. 14 in the arrangement of the P-type well PW.

Specifically, referring to FIG. 15, the P-type well PW is interposed between the first N-type well NW1 and the second N-type well NW2. The fin wirings 40 and 42 are formed on the first N-type well NW1, the fin wiring 43 is formed on the P-type well PW, and the fin wiring 44 is formed on the second N-type well NW2. The ground potential (VSS) is given to the metal wiring 70 and the power potential (VDD) is given to the metal wiring 71, similarly to the case of FIG. 14. On the other hand, the ground potential (VSS) is given to the metal wiring 72 and the power potential (VDD) is given to the metal wiring 73, contrary to the case of FIG. 14.

According to the above modification, in the case of FIG. 15, the N-type MIS transistor MN1 of FIG. 13 is formed by the fin wiring 43 and the gate wiring 52. The P-type MIS transistor MP3 is formed by the fin wiring 44 and the gate wiring 52. The local wiring 65 forms the source electrode of the N-type MIS transistor MN1 and the local wiring 66 forms the source electrode of the P-type MIS transistor MP3.

The other points of FIG. 15 are the same as in the case of FIG. 14; therefore, the same reference codes are attached to the same or corresponding portions without repeating the description thereof.

[Effect of Second Embodiment]

According to the second embodiment, it is possible to stabilize the output of the PUF circuit, reduce the power consumption, speed up the operation, and reduce the circuit size, similarly to the first embodiment. Further, when property variations in the P-type MIS transistors are larger than those in the N-type MIS transistors caused by the manufacturing process, the PUF circuit in the semiconductor device according to the second embodiment is more stable in the output and more effective than that in the semiconductor device according to the first embodiment.

Third Embodiment

A semiconductor device according to a third embodiment is to illustrate one example of the structure of the response signal creating circuit 31 having been described in FIG. 2 according to the first embodiment. Hereinafter, it will be specifically described with reference to the drawings.

[Structure of Authentication Circuit]

Figure 16:
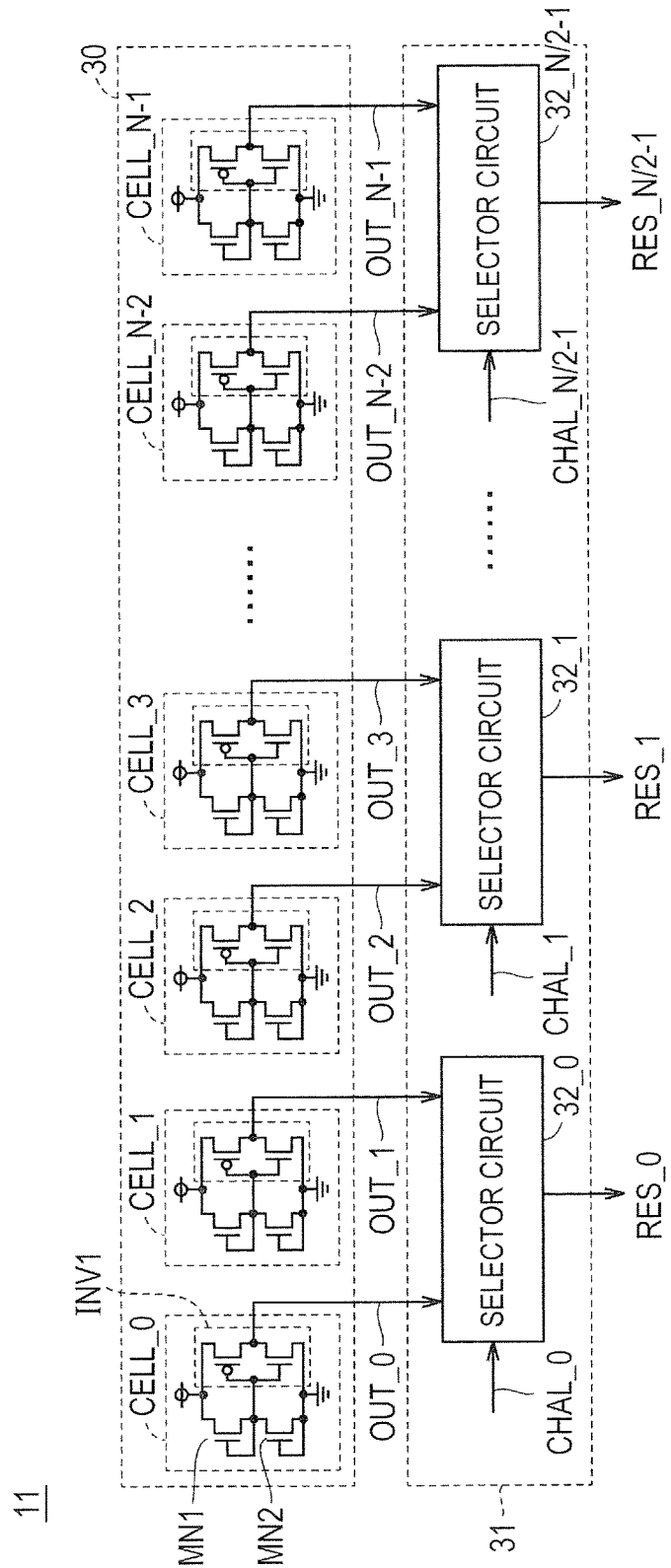
FIG. 16 is a block diagram showing a structure of an authentication circuit in a semiconductor device according to a third embodiment.

FIG. 16 is a block diagram showing a structure of an authentication circuit in a semiconductor device according to a third embodiment. With reference to FIG. 16, the authentication circuit 11 includes the PUF circuit 30 and the response signal creating circuit 31. The PUF circuit 30 includes N pieces of the cell circuits (PUF elements) CELL_0 to CELL_N−1 (N is even number). The structure of the cell circuit CELL may be identical to the structure of FIG. 3 according to the first embodiment or the structure of FIG. 13 according to the second embodiment.

The response signal creating circuit 31 includes N/2 pieces of selector circuits 32_0 to 32_N/2−1. Further, the response signal creating circuit 31 receives the challenge signals CHAL_0 to CHAL_N/2−1 of N/2 bits respectively corresponding to N/2 pieces of the selector circuits 32_0 to 32_N/2−1. The N/2 pieces of the selector circuits 32_0 to 32_N/2−1 correspond to the selector circuit 31A of FIG. 2, showing the internal structure of the selector circuit 31A.

As illustrated in FIG. 16, each selector circuit 32_i (i=0 to N/2−1) responds to two cell circuits CELL_2i and CELL_2i+1, receiving the output signals OUT_2i and OUT_2i+1 of the corresponding cell circuits. The selector circuit 32_i selects one of the output signals OUT_2i and OUT_2i+1, according to the logic level of the corresponding challenge signal CHAL_i and outputs the selected output signal as a response signal RES_i.

[Effect of Third Embodiment]

According to the structure of the above response signal creating circuit 31, the bit number of the response signal RES is N/2 bits on the whole, and therefore, $2^{N/2}$ types of response signals RES can be obtained. Only the N/2 pieces of the selector circuits are required in order to create these response signals.

On the other hand, for example, the Ring Oscillator PUF of the related art (refer to FIG. 5 in Japanese Unexamined Patent Application Publication No. 2011-198317) needs N pieces of selectors, N pieces of counter circuits, and N/2 pieces of comparators for comparing the outputs of the two corresponding counter circuits, in order to obtain the response signals of N/2 bits. The circuit area increases in order to mount these circuits.

As mentioned above, according to the embodiment, it is possible to realize a silicon PUF capable of outputting a response signal of N/2 bits in a comparatively small circuit area.

Fourth Embodiment

In a fourth embodiment, as a concrete example of the authentication system using the semiconductor device having been described in the first to the third embodiments, an automatic operation system will be described.

Figure 17:
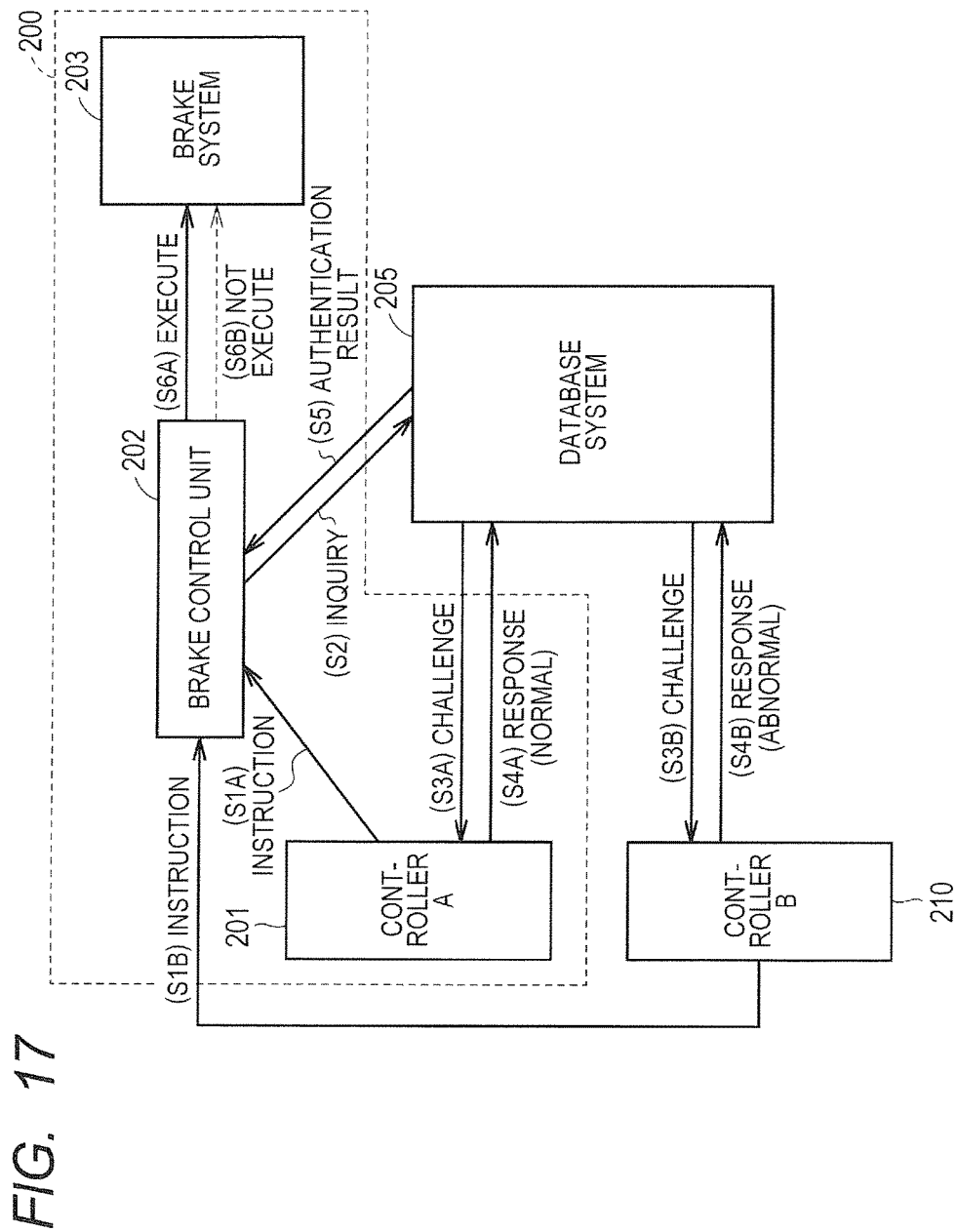
FIG. 17 is a block diagram schematically showing a structure of an automatic driving system.

FIG. 17 is a block diagram schematically showing the structure of the automatic operation system. The automatic operation system 200 of FIG. 17 includes a controller A (201) for controlling various types of electronic control units mounted in an automobile, in order to do automatic driving. In FIG. 17, as an example of the electronic control unit, a brake control unit 202 for controlling a brake system 203 is representatively shown.

The controller A (201) contains the authentication circuit 11 having been described in the first to the third embodiments. Combinations of various types of challenge signals and the corresponding response signals from the controller A (201), measured before the shipment of the controller A (201) are stored in a database system 205. The database system 205 of FIG. 17 corresponds to the computer system 20 of FIG. 1.

At an actually using time, various types of electronic control units such as the brake control unit 202 of FIG. 17 mounted in an automobile inquire of the database system 205 provided outside of the automobile through a network, about whether the controller A (201) for automatic operation is a regular product or not. The database system 201 determines whether or not the controller A (201) is the regular product. Only when the controller A (201) is determined as the regular product, the electronic control units are configured to follow the instruction from the controller A (201); otherwise, they reject the instruction from the controller A (201). Hereinafter, the procedure of the above authentication at the actually using time will be described in details with reference to FIG. 17.

At first, when the controller A (201) intends to drive the brake system 203 of the automobile, it transmits a driving instruction of the brake system 203 to the brake control unit 202 (Step S1A). Upon receipt of the driving instruction from the controller A (201), the brake control unit 202 inquires of the database system 205 provided outside of the automobile about whether the controller A is the regular product or not (Step S2).

Upon receipt of the above inquiry, the database system 205 transmits a challenge signal to the controller A (201) through the network (Step S3A). The authentication circuit (refer to the reference code 11 of FIGS. 1, 2, and 16) of the controller A (201) outputs a response signal corresponding to the challenge signal (Step S4A). The database system 205 determines whether or not the response signal stored in the own database correspondingly to the transmitted challenge signal agrees with the response signal received from the controller A (201).

In the case of agreement of the both response signals (in other words, when the response signal from the controller A (201) is right), the database system 205 outputs the authentication result that the controller A (201) is the regular product to the brake control unit 202 (Step S5). Upon receipt of the authentication, the brake control unit 202 executes a driving instruction from the controller A (201) (in other words, it drives the brake system 203) (Step S6A).

On the other hand, assume that a fake controller B (210) provided outside of the automatic operation system 200 transmits the driving instruction of the brake system 203 to the brake control unit 202, pretending to be the controller A (201) (Step S1B). In this case, upon receipt of the inquiry from the brake control unit 202 (Step S2), the database system 205 transmits the challenge signal to the controller B (210) (Step S3B). However, the response signal received from the controller B (210) (Step S4B) does not agree with the response signal corresponding to the controller A (201) stored in the database. As the result, the database system 205 transmits the result that the controller B (210) is not the regular product to the brake control unit 202 (S5). As the result, the brake control unit 202 does not execute the driving instruction of the brake system 203 from the controller B (210) (Step S6B).

As mentioned above, the above automatic operation system 200 with the authentication circuit based on the PUF circuit assembled can identify the driving instruction from the other controller B (210) pretending to be the controller A (201). Therefore, the automatic operation system 200 can avoid a fraudulent operation instruction (for example, disturbing putting on a brake) issued by the fake controller B (210) outside of the automobile through wireless communication.

As set forth hereinabove, the invention made by the inventor et al. has been specifically described according to the embodiments; the invention, however, is not restricted to the above forms and it is needless to say that various modifications are possible without departing from the spirit.

What is claimed is:

1. A semiconductor device comprising:
   first and second Metal Insulator Semiconductor (MIS) transistors of same conductive type, coupled in series between a power source node and a ground node, with each gate and source coupled together; and
   a logic circuit that receives a potential of a connection node of the first and second MIS transistors as an input signal,
   wherein the respective MIS transistors forming the first and the second MIS transistors and the logic circuit are fin-type Field Effect Transistors (FET),
   wherein back gates of the first and second MIS transistors are coupled to a same node,
   wherein each of the first and second MIS transistors is an N-type transistor,
   wherein each back gate of the first and second MIS transistors is coupled to a ground node,
   wherein the cell circuit includes:
     first and second fin wirings, each extending in a first direction, formed on a P-type well and arranged in a second direction crossing the first direction;
     a first gate wiring extending in the second direction, coupled to the first fin wiring through a gate insulating film;
     a second gate wiring extending in the second direction, coupled to the second fin wiring through the gate insulating film;
     a first local wiring extending in the second direction, directly coupled to both the first and the second fin wirings;
     a second local wiring extending in the second direction, directly coupled to the first fin wiring at a position opposite to the first local wiring with the first gate wiring interposed therebetween and coupled to a power source wiring in an upper layer;
     a third local wiring extending in the second direction, directly coupled to the second fin wiring at a position opposite to the first local wiring with the second gate wiring interposed therebetween and coupled to a ground wiring in the upper layer;
     a fourth local wiring directly coupled to the first gate wiring and the first local wiring; and
     a fifth local wiring directly coupled to the second gate wiring and the third local wiring,
   wherein the first fin wiring and the first gate wiring form the first MIS transistor, and
   wherein the second fin wiring and the second gate wiring form the second MIS transistor.

2. The semiconductor device according to claim 1, wherein the connection node of the first and second MIS transistors connects a source of one of the first and second MIS transistors with a drain of another one of the first and second MIS transistors.

3. A semiconductor device comprising:
   a plurality of cell circuits, each of the cell circuits including:
     first and second MIS transistors of same conductive type, coupled in series between a power source node and a ground node, with each gate and source coupled together; and
     a logic circuit that receives a potential of a connection node of the first and second MIS transistors as an input signal and outputs an output signal; and
   a response signal creating circuit that creates a response signal of one or more bits, based on challenge signals of bits and the output signals of the logic circuits,
   wherein the respective MIS transistors forming the first and the second MIS transistors and the logic circuit are fin-type FETs,
   wherein each of the first and second MIS transistors is an N-type transistor,
   wherein each back gate of the first and second MIS transistors is coupled the ground node,
   wherein each of the cell circuits includes:
     first and second fin wirings each extending in a first direction, formed on a P-type well and arranged in a second direction crossing the first direction;
     a first gate wiring extending in the second direction, coupled to the first fin wiring through a gate insulating film;
     a second gate wiring extending in the second direction, coupled to the second fin wiring through the gate insulating film;
     a first local wiring extending in the second direction directly coupled to both the first and the second fin wirings;
     a second local wiring extending in the second direction, directly coupled to the first fin wiring at a position opposite to the first local wiring with the first gate wiring interposed therebetween and coupled to a power source wiring in an upper layer;
     a third local wiring extending in the second direction, directly coupled to the second fin wiring at a position opposite to the first local wiring with the second gate wiring interposed therebetween and coupled to a around wiring in the upper layer;
     a fourth local wiring directly coupled to the first gate wiring and the first local wiring; and
     a fifth local wiring directly coupled to the second gate wiring and the third local wiring,
   wherein the first fin wiring and the first gate wiring form the first MIS transistor, and
   wherein the second fin wiring and the second gate wiring form the second MIS transistor.

4. The semiconductor device according to claim 3, wherein the response signal creating circuit includes a selector circuit that outputs, according to the challenge signal, one or more output signals selected from the output signals of the logic circuits as the response signal.

5. The semiconductor device according to claim 3, wherein the logic circuit includes an inverter that inverts a logic level of the input signal.

6. A semiconductor device comprising:
   a plurality cell circuits, each of the cell circuits including:
     first and second MIS transistors of same conductive type, coupled in series between a power source node and a ground node, with each gate and source coupled together; and
     a logic circuit that receives a potential of a connection node of the first and the second MTS transistors as an input signal and outputs an output signal; and
   a response signal creating circuit that creates a response signal of one or more bits, based on challenge signals of bits and the output signals of the logic circuits,
   wherein the semiconductor device comprises N pieces (N is an even number) of the cell circuits,
   wherein the response signal creating circuit includes N/2 pieces of selectors, each corresponding to two individual cell circuits, and wherein each of the selectors outputs an output signal from one of the corresponding two cell circuits as a value of bit corresponding to the response signal, according to a value of the challenge signal of the corresponding bit of the N/2 bits of the challenge signals.

7. An authentication system comprising:
a semiconductor device including:
   a plurality of cell circuits; and
   a response signal creating circuit,
wherein each of the cell circuits includes:
   a first and a second MIS transistor of same conductive type, coupled in series between a power source node and a ground node, with each gate and source of a transistor coupled together; and
   a logic circuit that receives a potential of a connection node of the first and the second MIS transistors as an input signal and outputs an output signal,
wherein the response signal creating circuit creates a response signal of one or more bits, based on challenge signals of several bits and the output signals of the logic circuits; and
a computer system that:
   creates the challenge signals; and
   determines, based on the response signal, whether or not the semiconductor device is acceptable,
wherein the semiconductor device comprises N pieces (N is an even number) of the cell circuits,
wherein the response signal creating circuit includes N/2 pieces of selectors, each corresponding to two individual cell circuits, and
wherein each of the selectors outputs an output signal from one of the corresponding two cell circuits as a value of bit corresponding to the response signal, according to a value of the challenge signal of the corresponding bit of the N/2 bits of the challenge signals.

* * * * *